Patented Apr. 19, 1938

2,114,354

UNITED STATES PATENT OFFICE 2,114,354

PROCESS FOR UTILIZATION OF SPENT REAGENTS

Evert T. Pummill, Augusta, Kans., assignor to Socony-Vacuum Oil Company, Incorporated, New York, N. Y., a corporation of New York No Drawing. Application January 4, 1936, Serial No. 57,525

3 Claims. (Cl. 23—86)

In the refining of petroleum distillate products for removal of sulphur compounds or the alteration of the corrosive nature of some sulphur compounds, the distillates are treated by contact with "doctor" solution, which is a sodium plumbite caustic soda solution formed by dissolving litharge in aqueous caustic soda solution. Completion of the reactions of doctor treating results in the transformation of the doctor solution into a suspension of lead sulphide in a solution of caustic soda which contains sodium plumbite. Spent doctor reagent is commonly recovered by oxidizing it, the usual method being by blowing with air at somewhat elevated temperatures, frequently under some pressure. In this recovery, lead sulphide is reoxidized, the sulphide constituents are blown out of the solution, and the reformed litharge dissolves to give a renewed solution of sodium plumbite. After continued revivification by this method, the nature of the spent doctor solution eventually becomes such that it cannot be oxidized by air-blowing to any reasonable degree of completeness without excessively long blowing. Under present conditions, when the spent doctor reaches this condition, it is cheaper to discard than to revivify. Before discarding, it may be settled to separate lead sulphide or "black strap", which may be mixed with fresh caustic and air blown to give new doctor solution. The remaining caustic solution, containing a very considerable amount of lead, is discarded. This results in an economic waste which is large in the aggregate, and the discarded material may become offensive and give rise to disposal problems. This invention is directed to the further recovery of this spent reagent and to methods for recovering therefrom useful reagents for use in treating oil.

The object of this invention is to provide a process whereby spent sodium plumbite reagent solutions may be completely converted into reagents useful in petroleum refining.

This invention is based upon the discovery that if a sodium plumbite solution not fit for recovery by oxidation with air be contacted with chlorine in a proper manner, that litharge will be precipitated in a recoverable physical form, chemically fit for reuse in the formation of doctor solution, and that the remaining caustic solution may be chlorinated to form sodium hypochlorite, which is likewise a useful reagent for treating oils.

In this manner a complete recovery of the reagent values in spent doctor may be had, and no waste reagent need be discarded. The spent doctor which cannot be economically revivified by blowing with air is settled, and the solution separated from the "black strap." The "black strap" (lead sulphide slurry) is mixed with fresh caustic in proper proportions, and air blown to give new doctor solution, according to the usual practice. Then the solution which was withdrawn from above the settled black strap is chlorinated resulting first in the precipitation of litharge from the solution as a yellow powder. The settled litharge and chlorinated solution are separated by decantation, etc., and the litharge may be mixed with fresh caustic solution in proper proportions and formed into fresh doctor solution. The remaining solution is then further chlorinated to form sodium hypochlorite, other caustic solution being added to bring it to the proper strength if necessary.

In practice I prefer to thoroughly settle the spent doctor solution, and then to separate from it both the black strap accumulated at the bottom of the tank and the oil which has risen to the top. The remaining solution is then subjected to chlorination, either in the same tank, or preferably in a contacting tank equipped with a proper pipe spider for the introduction of chlorine and with a bottom draw-off whereby the slurry of precipitated litharge may be removed. Gaseous chlorine is introduced, at such a rate as to bring about a sufficiently rapid precipitation of litharge without the formation of lead compounds of higher degrees of oxidation, or of amphoteric lead compounds. In order to avoid these undesirable results the temperature of the solution undergoing chlorination should not be over 100° F., and the rate of chlorine addition preferably should not be greater than .001 pound per minute per gallon of solution. Chlorination should be continued at this rate until the precipitation of litharge is complete. This may be observed visually, but it is well to control the addition of chlorine to give complete precipitation of lead by applying some convenient laboratory test for lead in solution. One rapid and accurate test found convenient for this purpose is that of titrating 10 cubic centimeters of doctor solution, slightly acidified with acetic acid, diluted to 200 cc., at boiling temperature with a standardized ammonium molybdate solution, using tannin indicator. After the precipitation and separation of the litharge, the slurry of litharge is removed from the vessel, or the solution is decanted, and chlorination is continued until a complete conversion of caustic soda to sodium hypochlorite is had. The product of this final step, if of proper strength, may be used directly for various oil refining processes. If too strong, it may be diluted, and if too weak, more caustic may be added and chlorinated.

As an example of the operation of my invention, I may cite the treatment of a batch of 200 gallons of spent doctor solution, which had previously been settled free of black strap and skimmed of oil, and which had a Baumé gravity of 18° and a lead content of .02 pound per gallon. This solution was treated at a temperature of 75° F. with gaseous chlorine at the rate of .0007 pound per minute per gallon of solution until 1.4 pounds of chlorine had been used. This resulted in the precipitation of litharge, and 20 gallons of slurry having a lead content of 3.9 pounds was recovered, representing 97.5% of the lead in the original spent doctor reagent which would otherwise have been discarded. The remaining solution was then chlorinated with an additional .05 pound of chlorine per gallon, resulting in the formation of 180 gallons of solution of sodium hypochlorite, having .04 pound per gallon available chlorine. This was used in oil treating, and thus the greater portion of the caustic which would otherwise have been discarded was recovered. The cost of such chlorination was not excessive, and additionally the problem of disposal of an objectionable trade waste was avoided.

The temperature at which the chlorination may be carried out may vary from 50° to 100° F., with good results. The rate of chlorination may vary from .0005 pound/minute per gallon of solution to .001 pound per gallon of solution with good results.

The recovery operations may be carried out in any appropriate apparatus, which is usually available in a considerable variety of forms around a refinery treating plant.

I claim:

1. A method for substantially complete recovery of the ingredients of spent doctor solution comprising the steps of settling the spent doctor solution to permit its separation into a layer of oil, a layer of caustic solution containing substantially no lead sulfide, and a "blackstrap" layer consisting of a slurry of lead sulfide in caustic solution, separately withdrawing the intermediate caustic solution layer, contacting this intermediate caustic solution layer with gaseous chlorine to precipitate litharge therefrom, separating and removing the litharge so produced, and chlorinating the remaining solution to form sodium hypochlorite.

2. A method for substantially complete recovery of the ingredients of spent doctor solution comprising the steps of settling the spent doctor solution to permit its separation into a layer of oil, a layer of caustic solution containing substantially no lead sulfide, and a "blackstrap" layer consisting of a slurry of lead sulfide in caustic solution, separately withdrawing the intermediate caustic solution layer, passing gaseous chlorine through such solution at a temperature not in excess of 100° F. until the lead present is substantially completely precipitated as litharge, separating and removing the litharge thus formed, and chlorinating the remaining solution to form hypochlorite.

3. A method for substantially complete recovery of the ingredients of spent doctor solution comprising the steps of settling the spent doctor solution to permit its separation into a layer of oil, a layer of caustic solution containing substantially no lead sulfide, and a "blackstrap" layer consisting of a slurry of lead sulfide in caustic solution, separately withdrawing the intermediate caustic solution layer, contacting this intermediate caustic solution layer with chlorine at temperatures between 50° F. and 100° F. at a rate not in excess of .001 pound chlorine per minute per gallon of solution until lead therein is substantially completely precipitated as an insoluble lead-containing compound, separating the lead-containing precipitate and the caustic solution, and further chlorinating the caustic solution to form a hypochlorite solution.

EVERT T. PUMMILL